Jan. 16, 1934.    H. A. L. ESSMANN    1,944,071
WEIGHING DEVICE OR BALANCE
Filed July 29, 1929    2 Sheets-Sheet 1
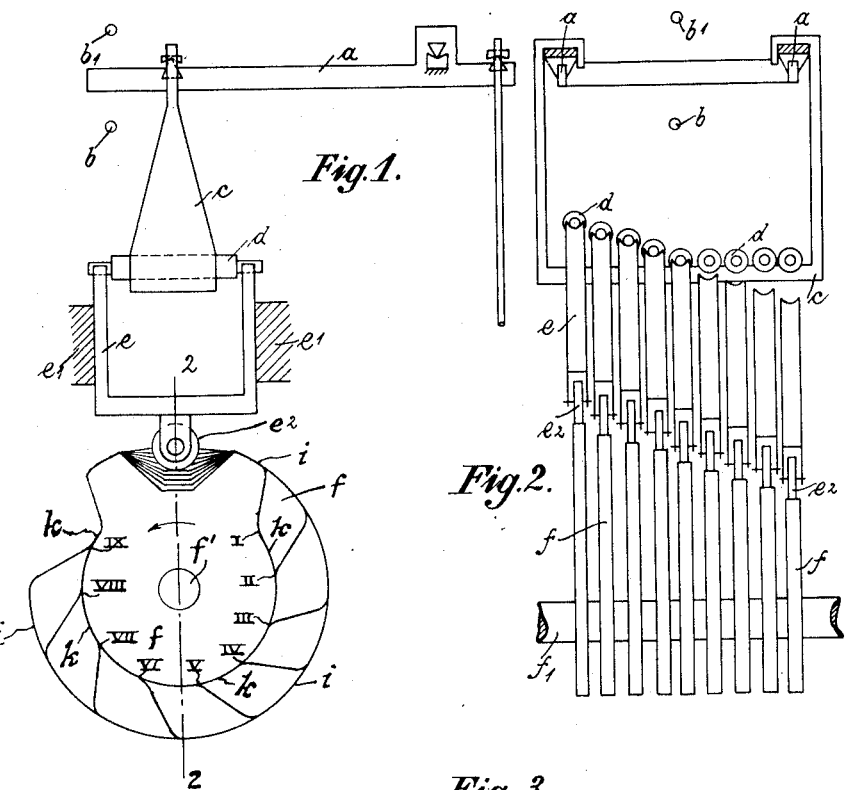
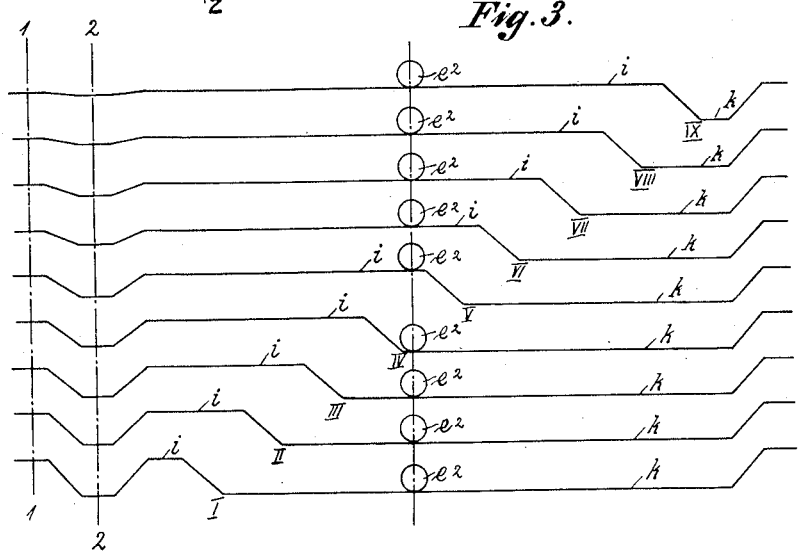

Patented Jan. 16, 1934

1,944,071

UNITED STATES PATENT OFFICE 1,944,071

WEIGHING DEVICE OR BALANCE

Heinrich August Ludwig Essmann, Altona-Klein-Flottbek, Germany, assignor to the firm Ottensener Waagenfabrik Albert Essmann & Co., Altona-Ottensen, Germany Application July 29, 1929, Serial No. 381,873, and in Germany August 1, 1928

5 Claims. (Cl. 265—48)

This invention relates to a weighing device or balance which automatically lifts the number of weights corresponding to the load being weighed. In such devices the centre of gravity must lie in the plane of the knife edges. Previous constructions of this kind are restricted to the employment of a small number of weights of a single denomination and for this reason can only be used as auxiliary weighing means in conjunction with other weighing devices.

The invention consists on the one hand in the feature that instead of a single weight carrier provided with stepped faces for the weights to be lifted there is provided for each weight to be lifted a carrier influenced by the controlling member and that all the weight carriers arranged with their lifting faces in stepwise relation in vertical direction are movable separately from and independently of one another by the switch member.

Further the invention resides in the feature that in order to be able to weigh loads of different orders of weights, that is within a large range, several sets of weights are brought in series in the sequence of the order of weights into the range of the oscillation of the weigh beam. With the employment of one or several sets of weights, after the weights have been lifted, these weights remain on the weigh beam and the respective weight carriers are moved downwards and the weight carriers for other weights are moved along therewith out of the range of movement of the weigh beam. Instead of bringing weights of different orders in series within the range of oscillation of the weigh beam the weights of such orders may be arranged stepwise in vertical direction within the range of oscillation of the weigh beam.

The invention is illustrated by way of example in the accompanying drawings:—

Figure 1 is a front elevational view of the invention,

Figure 2 is an end view thereof,

Figure 3 is a diagrammatic view of the cam lifting mechanism, and

Figure 4:
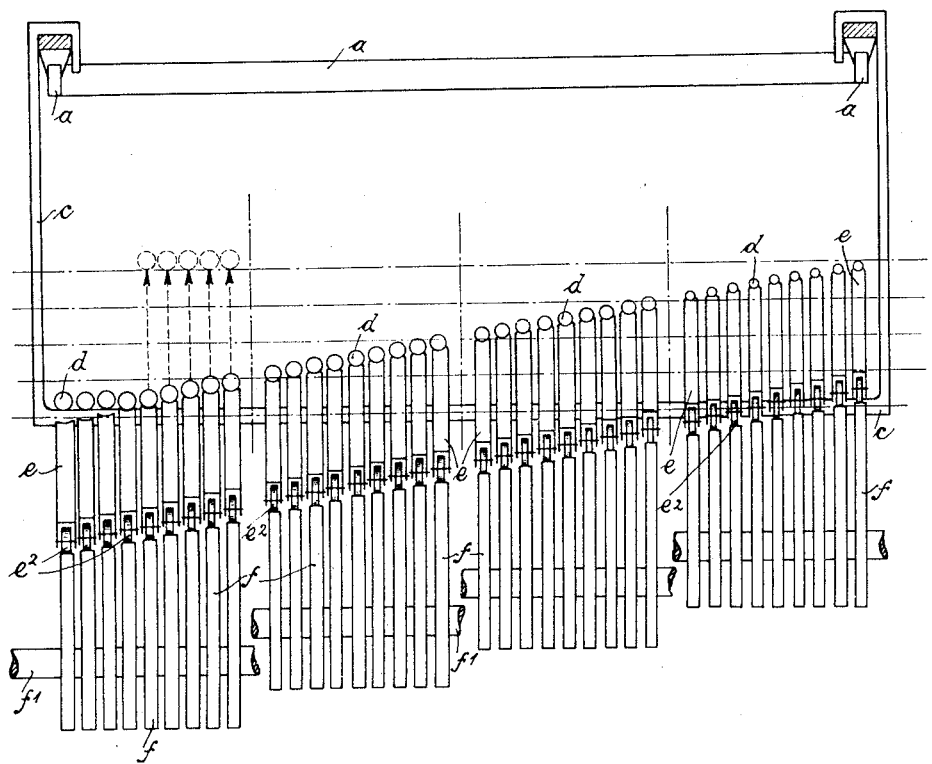
Figure 4 is an end view of a modification of the invention showing a plurality of stages of different orders of weights.

The balance represented in Figs. 1 and 2 is adapted for handling weights in accordance with a single decimal series. The beam $a$ having its center of gravity located in the plane of the knife edges is limited in its oscillation upwards and downwards by two stops $b$, $b'$, so that its longer arm which serves to lift the weights can oscillate within a definite angle only. As shown in Fig. 2, this arm comprises two limbs. Near the free end of the said limbs there is suspended thereon a bail $c$ of inverted U-shape, with a straight flat middle portion whereby the beam $a$ can lift the nine weights $d$. The weights $d$ which are equally heavy, are formed cylindrically and provided at their ends with gudgeons wherewith the weights $d$ rest normally in the upwardly directed forked ends of nine separate independent weight carriers $e$ which are movable up and down alongside one another in a stationary guide $e'$.

The weight carriers $e$ each carry a follower roll $e^2$ engaging one of the nine cams $f$ secured to a shaft $f'$. The nine cams have a progressively increasing lift, the increment being uniform. On the lift of the weight carriers $e$ effected by the cams in accordance with the line 1—1 the weight carriers and therewith the weights $d$ are brought into a raised position at the same level in which the weights $d$ carried thereby are located in a horizontal line at such level that the bail $c$ of the beam which is then located in its uppermost position lightly contacts with and engages the under-side of the weights. When, however, the cams $f$ are brought to the position 2—2, the weight carriers $e$ are lowered, the weights $d$ resting thereon assuming progressively lower positions in a uniformly stepped series. The weight influenced by the outermost cam $f$ having the maximum throw and located at the end of the row is at such a level that the bail $c$ of the weigh beam which is now in its lowermost position engages the under side of this lowest weight with light contact. The distance between this adjustment of the lowest weight $d$ and the adjustment of all the weights $d$ in their upper position corresponds to the total amplitude of vibration of the beam.

When the scale is not operated the nine cams $f$ will be in a position as shown in Figure 1, in which the weight carriers by their follower rolls project into the depressions (in line 1—1) of the cam disks. These depressions will, as will be clearly understood from Figure 1, decrease successively with regard to the depth, so that the weight carriers $e$ carry the weights $d$ in such a manner that the latter at uniform steps will follow successively in an inclined line. Beginning from the depression every cam disk $f$ has a supplemental cam part $i$ and a depressive part $k$ following the cam $i$. This will be clearly understood from Figure 3.

When the weight carriers $e$ and weights $d$ are lowered, the lowest weight at the end of the row depresses the beam $a$ into its lowest position. When now a load which is heavier than the total mass of four weights $d$ but less than that of five weights is laid on the pan or platform of the weighing device, the beam moves upwards, the bail $c$ commencing with the lowest weight, lifting four weights from their weight carriers $e$ and bearing on the fifth weight on the underside as shown in Fig. 2. As the load is not sufficient for this fifth weight to be lifted by the bail $c$, by the pressure of the bail on the underside of the fifth weight the movement of the beam $a$ is exactly determined, thus giving a means of indicating the weight of the load. This setting indicates that the load is less than the total mass of five weights.

If smaller increments of weight are to be indicated it is necessary to use a larger number of weights in which the difference between successive weights is less. If loads are to be weighed in different denominations, there are employed several sets of weights. Thus there would be retained the said nine weights for the usual decimal series. For a device weighing up to 10,000 kilograms there would be nine weights each of 1000 kilograms, nine weights each of 100 kilograms, nine weights each of 10 kilograms and nine weights each of one kilogram.

In a weighing device according to the invention with several denominations of weights, that is with several sets of weights each corresponding to one denomination of the decimal order, there is provided for each denomination the arrangement shown in Figs. 1 and 2 engaging the same beam, which may have if desired multi-limbed arms.

In weighing, the weights $d$ of the highest denomination are first engaged with the weigh beam and thereafter weights of lower denomination in succession. The weights $d$ of the lower denominations must in weighing be brought for the time being out of the range of the beam so that they do not influence its movement. The weights of the higher denominations which have already been lifted by the beam must, however, remain lying on the beam, while the weights of that denomination which have not been lifted and also the weight carriers $e$ for the weights which have been lifted must be removed from the range of oscillation of the beam. This is necessary in order that the use of weights of lower denomination on the beam, the latter may be able to oscillate freely and that the weights of the preceding higher denominations which have already been lifted thereby may not be again picked up by their weight carriers $e$. The latter must therefore be moved downwards by the cams $f$ while the weight carriers for the following lower denominations must be moved upwards by their cams $f$. This shift of the relative weight carriers by means of their cams $f$ is rendered possible by reason that the latter are given an additional cam step. This latter is shown diagrammatically in Fig. 3, in which the operative edge of all nine cams is shown developed one above the other. In Fig. 3 the points crossed by the chain dotted line 1—1 corresponding to the point of the cam $f$ represented by the line 1—1 in Fig. 1. The line 2—2 in Fig. 3 corresponds to the part denoted by the line 2—2 in Fig. 1 where the throw of the individual cams is progressively increased. As shown in Fig. 3 each point 2—2 is followed by an additional cam portion $i$. This cam portion increases in length in successive cams from the cam having the maximum throw at the point 2—2 (in Fig. 1 the front cam $f$, in Fig. 3 the line I). The cam portions $i$ lift the weight carriers $e$ of the weights, which have not been lifted by the beam $a$, while the depressions $k$ in the cams following the cam portions $i$ which are of progressively decreasing length in the reverse order effect the descent of those weight carriers $e$, the weights of which have been lifted by the beam.

When, as shown in Fig. 2, a beam lifts four weights $d$ the cam $f$ must be brought into the position IV (Fig. 3) relative to the follower rolls $e^2$ of the weight carriers $e$; then in consequence of the depressions $k$ the weight carriers $e$ for the lifted weights $d$ can descend, while in consequence of the cam portions $i$ the remaining weight carriers with their weights are shifted upwards. It is thus only necessary to fix the beam temporarily in its position and then to turn the cam $f$ corresponding to the direction of oscillation of the beam. After release of the beam the weights of the next following denomination can be applied.

Fig. 4 shows the progressive stepwise arrangement of the weights $d$ of all orders formed by four groups each consisting of nine weights $d$, the weight carriers $e$ and the stepped cam member (multi-stage cam $f$).

At the beginning of the upward movement of the beam $a$ or of the bail $c$ the lowest weight $d$ of one outer group and on completion of the movement the highest weight $d$ of the other outer group is engaged on its underside.

I claim:—

1. An automatic weighing device or balance comprising a beam, a system of several sets of weights of different orders disposed above the said beam, a scale cooperating with the said beam, the said beam automatically taking up a number of weights corresponding to the load on the said scale, a weight carrier for each weight, and adjusting means for the said carriers for bringing the weights not taken up by the said beam out of weighing range.

2. An automatic weighing device or balance as set forth in claim 1, in which the weight carriers may be moved independently of each other.

3. An automatic weighing device or balance as set forth in claim 1, in which cam members act as adjusting means and each cam member cooperates with one weight carrier.

4. An automatic weighing device or balance comprising a beam, a system of several sets of weights of different orders, a bail connected to said beam with which said weights cooperate, a weight carrier for each weight, cam members for moving said weight carriers, said cam members having supplemental cams associated therewith so that after the automatic lifting of the weights of one step or order, the lifted weights will remain suspended on said bail from said beam while the weight carriers associated with said lifted weights move downward and the remaining weight carriers together with the now lifted weights of this step or order can be moved upward out of the range of said beam.

5. An automatic weighing device or balance as set forth in claim 4 in which a single lifting member is provided for each order or denomination of weights, said weights being arranged in sequence according to the system of weights in a single step whereby the weights and the part of the lifting member acting thereon are coordinated stepwise so that during the continuous upward movement of the lifting member the weights of the entire row are lifted successively but during the weighing within each order the weights which are not lifted by the lifting member are adapted to be lifted beyond the maximum throw of the beam relative to all orders or denominations.

HEINRICH AUGUST LUDWIG ESSMANN.